(12) United States Patent
Ryan, Jr.

(10) Patent No.: US 8,467,566 B2
(45) Date of Patent: Jun. 18, 2013

(54) METHOD FOR DETECTING FRAUD IN A PRINTED IMAGE

(75) Inventor: Frederick W. Ryan, Jr., Oxford, CT (US)

(73) Assignee: Pitney Bowes Inc., Stamford, CT (US)

( * ) Notice: Subject to any disclaimer, the term of this patent is extended or adjusted under 35 U.S.C. 154(b) by 2279 days.

(21) Appl. No.: 11/245,238

(22) Filed: Oct. 6, 2005

(65) Prior Publication Data
US 2007/0081694 A1  Apr. 12, 2007

(51) Int. Cl.
*G06K 9/00*  (2006.01)

(52) U.S. Cl.
USPC ............ 382/100; 382/135; 382/139; 382/140; 382/175; 382/178; 382/183; 382/191; 382/202; 358/453; 380/243; 380/245; 380/51; 705/62

(58) Field of Classification Search
USPC ................. 382/101, 135, 139, 140, 175, 178, 382/183, 184, 191, 202, 280, 100; 358/453; 380/243, 245, 51; 705/62, 3.28
See application file for complete search history.

(56) References Cited

U.S. PATENT DOCUMENTS

| | | | |
|---|---|---|---|
| 5,815,172 A * | 9/1998 | Moh ............................... | 347/14 |
| 6,240,196 B1 * | 5/2001 | Fischer et al. ................ | 382/100 |
| 2003/0002711 A1 * | 1/2003 | Cordery et al. ............... | 382/101 |
| 2003/0197878 A1 * | 10/2003 | Metois et al. ................. | 358/1.9 |
| 2005/0111027 A1 * | 5/2005 | Cordery et al. .............. | 358/1.14 |

OTHER PUBLICATIONS

U.S. Appl. No. 10/720,292, Robert A. Cordery et al, filed Nov. 24, 2003.
U.S. Appl. No. 10/720,503, Bertrand Haas, filed Nov. 24, 2003.
U.S. Appl. No. 10/720,664, Bertrand Haas et al, filed Nov. 24, 2003.

* cited by examiner

*Primary Examiner* — Matthew Bella
*Assistant Examiner* — Julian Brooks
(74) *Attorney, Agent, or Firm* — Steven J. Shapiro; Charles R. Malandra, Jr.

(57) ABSTRACT

A method is provided for authenticating an image printed at a predefined print resolution or in accordance with a predetermined print grid. The method includes the steps of scanning the image to produce digital data and segmenting the data into first and second groups corresponding, respectively, to first and second predefined sections of the image. Next, a determination is made concerning the anticipated spatial position of select columns of digital data from each of the first and second groups of data. By examining the data, differences may be identified between the anticipated and actual spatial position of the columns, to determine the authenticity of the image. The identified differences which may include (i) a rotary/linear displacement in the actual spatial position of the select columns. (ii) a change in beat frequency between sections of the image, and/or (iii) a phase shift in a beat frequency. Furthermore, the printed image may include a predefined phase shift introduced at the time of original printing, i.e., a change in spatial separation between adjacent columns of the print grid. The predefined phase shift can be used as a mark to validate the authenticity of the printed image.

20 Claims, 5 Drawing Sheets

METHOD FOR DETECTING FRAUD IN A PRINTED IMAGE

TECHNICAL FIELD

This invention relates to fraud detection methods, and, more particularly, to a new and useful method for detecting fraud in connection with a printed image which has been altered and/or copied.

BACKGROUND OF THE INVENTION

Advances in the art of photocopying, digital image scanning and digital printing have made it increasingly difficult to distinguish between an original printed image and a photocopy or scanned-and-printed copy of the original image. These advances have widespread implications regarding secure documents/images including postage indicia, paper currency, bank/traveler checks and/or tickets for various events/entertainment. Inasmuch as such documents/images are assets having monetary value, it will be appreciated that they are vulnerable to counterfeiting by various alteration/copying techniques. To protect or secure these documents/images from such attacks, it is common to introduce "copy detection features" which produce changes relative to the original document/image in a manner that can be readily detected with a high degree of reliability and convenience.

One of the more common "copy detection features" may be found in bank or payroll checks wherein, if copied, a word such as "VOID" or "COPY" appears prominently and/or repeatedly on the face of the copied check. Therein, special thermally-activated ink is employed which blends into the background so as to be practically unnoticeable on the face of the original, however, when the original is copied, the ink is prominently displayed. That is, the heat generated during the photocopying process produces a thermal reaction which causes the ink to give a bold appearance. Hence, a clearly readable message that the check has been copied can be produced to alarm an unsuspecting recipient.

Another example of the use of copy detection features is seen in connection with a postage meter indicia 10 illustrated in FIG. 1. Such indicia 10 are printed on a mailpiece as an indication that the appropriate postage has been paid. Indicia 10 typically include textual information such as the class of mail 12, a postage meter serial number 14, and the postage amount 16. The indicium 10 also includes graphic elements such as a logo 22. Such graphic elements may be printed with copy detection features such as the use of special fluorescent inks. By using inks which fluoresce in the presence of a light source, automated postal equipment can readily identify postage indicia 10 which employ the fluorescing ink, i.e., those printed using a valid postage meter (not shown). In contrast, postage indicia which do not use the fluorescing ink 10, i.e., those copied or scanned/printed, can be identified as being invalid or potentially fraudulent.

It will be appreciated that such copy detection features can be readily incorporated in dedicated/validated postage meters, i.e., those authorized by the United States Parcel Service (USPS) or its designee. That is, authorized postage meters could be equipped with a special print cartridge containing the fluorescing ink. More recently, however, home-based (i.e., Personal Computer-based) postage meter systems have been authorized which make use of commercially available digital printing equipment, i.e., printers fabricated by any one of a variety of manufacturers. Such systems, which print valid postage indicium, have become available through on-line internet service providers, e.g., Netstamps.com offered by Stamps.com, Clickstamp™ Online, etc. While such home-based postage meter systems facilitate the acquisition of valid postage, these systems lack graphic security features, such as the copy detection features, which were previously available through dedicated postage meters.

Concurrently, the USPS has required that postage meter indicia 10 include postal information in machine-readable and machine verifiable format. In FIG. 1, the indicium 10 includes a machine readable, two-dimensional barcode 24 which carries the postage amount and other mailpiece information, such as the class of service. Upon entry into the mail distribution system, it is the barcode 24 portion of the indicium 10 that is automatically read/checked by automated postal equipment. The barcode 24 is provided in accordance with Information Based Indicia (hereinafter "IBI") standards of the United States Postal Service.

In view of the foregoing, the barcode 24 is essentially the only portion of the indicium 10 where copy detection features can be implemented, inasmuch as the barcode 24 is the only portion of the indicium 10 currently being examined. Further, the barcode 24, as currently configured and implemented, lacks the necessary security features and may be readily be copied. The two attacks which are most probable include:

1) making multiple copies of the indicium 10 without payment.

2) printing a single high denomination indicium to produce multiple copies of the barcode and, subsequently, printing multiple low denomination indicia such that the high denomination barcode may be incorporated into each of the low denomination indicia (replacing each of the low denomination barcodes with the high denomination barcodes by carefully cutting and pasting the two elements together).

Protection against the first attack can be provided by incorporation of an adjacent logo having a robust or fragile watermark, as described in the above mentioned co-pending patent application Ser. No. 10/720,664 "Fragile Watermark for Detecting Printed Image Copies" and Ser. No. 10/720,292 "Detecting Printed Image Copies Using Phase-Space-Encoded Fragile Watermark", or by use of any other convenient copy detection feature, such as a commercially available Mediasec Copy Detection Pattern.

The second form of attack, i.e., cutting and pasting barcode copies, would seemingly be readily defeated by a simple visual inspection e.g., by a postal service worker using a standard magnifying glass. Unfortunately, the millions of mailpieces processed daily do not facilitate this form of inspection, i.e., such examination being time prohibitive.

Another method to combat this second form of attack is discussed in co-pending commonly owned U.S. patent Ser. No. 11/011,829 entitled, "Method and System for Printing An Original Image and For Determining If A Printed Image Is An Original or Has Been Altered". This method establishes a correlation or connection between a watermarked logo and an adjacent barcode, which correlation is detectable by automated postal equipment upon induction into the mail distribution system. More specifically, the image or logo includes coded information and a copy detection feature putatively linked to the coded information such that a determination can be made concerning whether the logo and adjacent barcode have been artificially put together, i.e., such as by cutting and pasting.

While this method offers a reliable and traceable solution concerning the alteration of an indicium, the computational requirements to create the linkage for every indicium can be time prohibitive. That is, while the processing time to perform the required steps may take only a fraction of a second, e.g., 0.125 seconds, even such a small increment of time can be prohibitive in a mailing machine that processes over twenty-thousand (20,000) mailpieces per hour. In addition, some mail processing systems have limited processing capability and are not capable of creating the watermark in a reasonable amount of time. Hence, this solution has limited application and can only be used selectively.

A need, therefore, exists for a method for determining whether a printed image (an image having a monetary value, such as postage indicium or paper currency) has been altered or copied with minimal impact on process flow or throughput, i.e., without adversely impacting the speed of commercial transactions.

SUMMARY OF THE INVENTION

A method is provided for authenticating an image printed at a predefined print resolution or in accordance with a predetermined print grid. The method includes the steps of scanning the image to produce digital data and segmenting the data into first and second groups corresponding, respectively, to first and second predefined sections of the image. Next, a determination is made concerning the anticipated spatial position of select columns of digital data from each of the first and second groups of data. By examining the data, differences may be identified between the anticipated and actual spatial position of the columns, to determine the authenticity of the image. The identified differences which may include (i) a rotary/linear displacement in the actual spatial position of the select columns. (ii) a change in beat frequency between sections of the image, and/or (iii) a phase shift in a beat frequency. Furthermore, the printed image may include a predefined phase shift introduced at the time of original printing, i.e., a change in spatial separation between adjacent columns of the print grid. The predefined phase shift can be used as a mark to validate the authenticity of the printed image.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

FIG. 3b is an enlarged view of the printed and distorted image of FIG. 3a

DETAILED DESCRIPTION

The present invention describes a method for detecting whether an image has been altered, i.e., via cutting and pasting, or copied using signal processing techniques which minimize computational and/or processing requirements. Further, the method may be performed without prior knowledge of or data relating to the printer or scanner used to produce the original image. Moreover, the method enables the use of various graphic security measures, such as the use of robust or fragile watermarks, without the requirement to link or correlate graphic images with a barcode image (offered as a potential solution in a prior art method discussed in the Background of the Invention). Additionally, while the present invention is described in the context of postage indicium, it will be appreciated that the method is broadly applicable to any image wherein alteration or copying thereof is attempted in an effort to benefit through counterfeiting or fraud.

The method of the present invention employs certain features of digital printing and digital scanners to ascertain whether an image has been altered and/or copied. Such features generally relate to the manner in which printers and/or scanners print and capture images. To appreciate several of the teachings employed herein, a brief description of digital printers and scanners follows. More particularly, a discussion is provided addressing the print and scanning resolution, together with a description of the impact that each parameter has on the printed and/or acquired image.

Digital printers, whether those incorporated in a dedicated postage meter or those which generically print variable data (those used in conjunction with conventional personal computers) produce images by depositing thousands of small ink dots on a substrate material (sheet material or a plain envelope) in a recognizable and regular pattern or grid. These ink dots are patterned by the control algorithms of a digital printing device. More specifically, the ink dots are deposited by a computer controlled print head having a closely spaced, linear array of nozzles or ports. These digital printing devices transmit a column of data (printed pixels) to the print head and generate a periodic strobe signal. The strobe signal causes the print head to transfer ink from the linear array of nozzles at regular intervals in both a horizontal and vertical direction.

Figure 2:
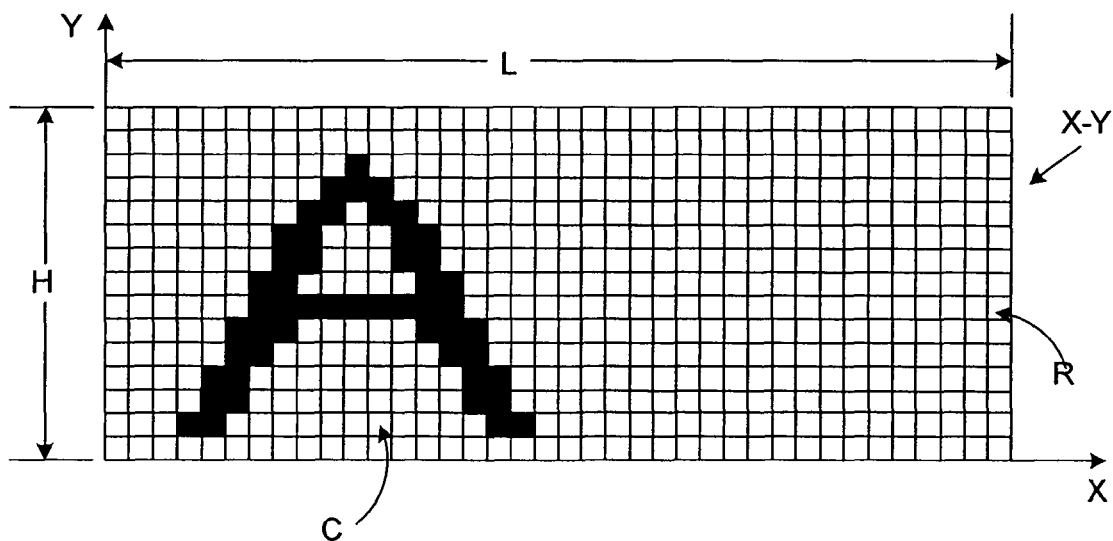
FIG. 2 is a schematic illustration of a print grid or resolution pattern produced by a digital printer.

The ink is generally deposited in a recognizable two dimensional grid X-Y such as that depicted in FIG. 2. The number of dots which may be deposited over a length of one inch is referred to as the resolution of the printer, expressed in dots per inch (dpi). The print grid X-Y comprises forty (40) columns C along a length dimension L and fifteen (15) rows R along a height dimension H. Notwithstanding its relative size, it should be appreciated that the print grid X-Y is regular and periodic, i.e., configured in a checkerboard pattern. Consequently, one can view an image as being produced by a plurality of columns of printed pixels spaced at regular/equal increments. That is, the spacing between adjacent columns is generally constant. In one embodiment, however, described in greater detail hereinafter, a second spatial separation may be introduced between adjacent columns to provide a means for validating or authenticating a printed image.

Digital scanners have many of the same attributes or physical characteristics of a digital printer. Scanners recreate images by visually capturing an image as a grid of dots. Various attributes of a digital scanner determine the size and spacing of the grid. The horizontal spacing of the grid over a length of one inch is referred to as scanner resolution, also expressed in dots per inch (dpi).

In addition to the similarities between the printer and scanner resolutions, another relationship, arising from the combination of the two, will be useful to better understand the teachings of the present invention. This relationship, known as the "beat frequency", arises when the original printer resolution is different than the scanner resolution used to capture the image. More specifically, when the scanner resolution is different from the print resolution, e.g., the print resolution may be fixed at 200 dpi while the scanner resolution may be set at 300 dpi, the captured image will be distorted (albeit slightly) when scanned. This distortion is a result of the printer and scanner frequencies "beating" against the other, hence, giving rise to the term beat frequency.

Figure 3A:
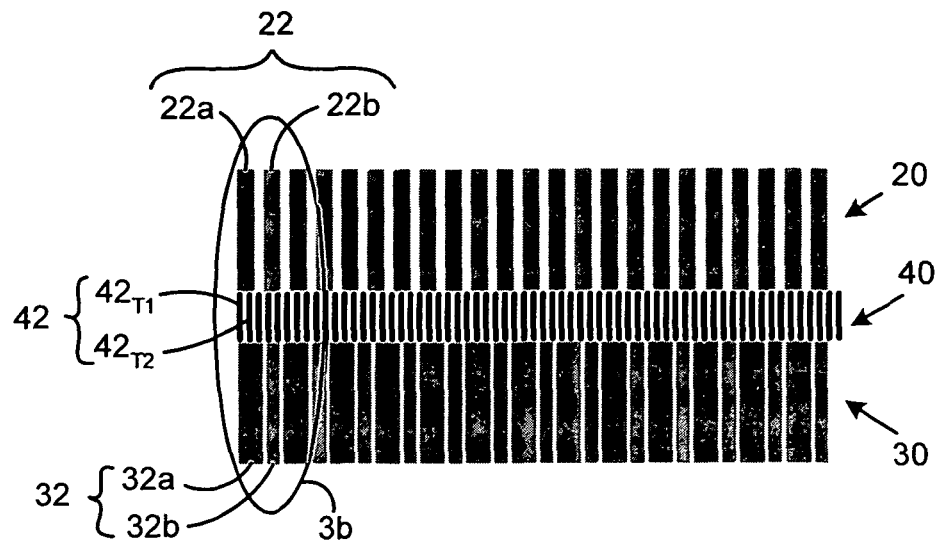
FIG. 3a schematically illustrates the distortion of a printed image and the beat frequency produced as a result of differing resolutions between a digital printer and digital scanner.
Figure 3B:
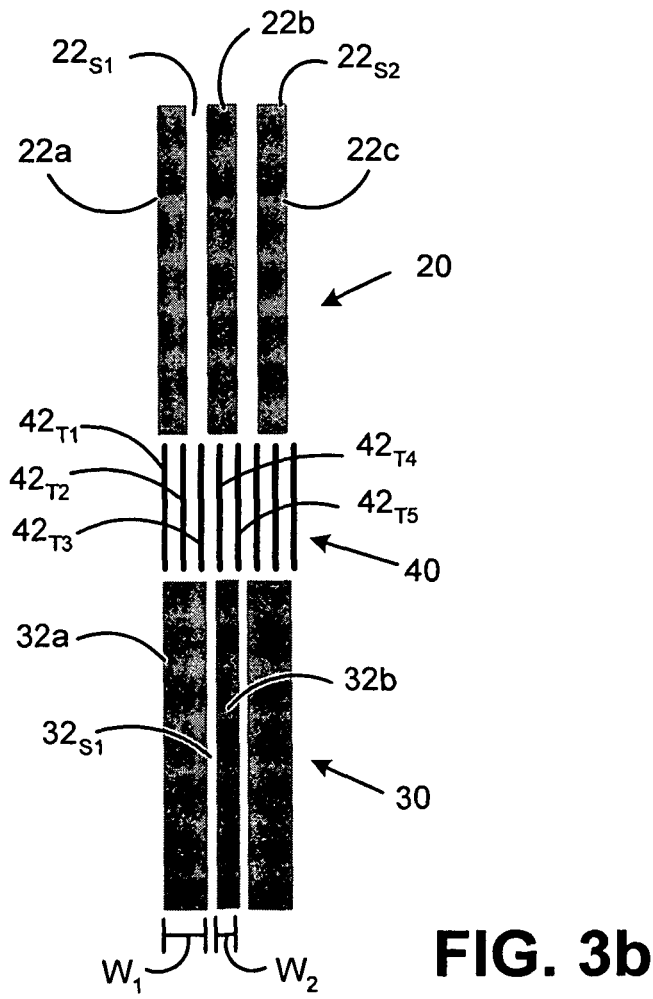

A better understanding of the beat frequency may be obtained by examining FIGS. 3a and 3b. Therein, an original image 20 is characterized by a series of vertical bars 22 and is printed at a print resolution of, for example, 200 dpi. Furthermore, the vertical bars 22 each have a constant width dimension and equal spacing between the bars 22. When a scanner captures this image using the same scan resolution, the original image 20 may be reproduced exactly or identically. That is, for each increment of time that the scanner records or captures the original image, any change occurring in the original image, i.e., from a solid bar to a white space between two bars, occurs at precisely the same intervals due to the equal resolutions of both the printer and scanner. However, should the original image 20 be scanned at a different resolution or frequency, for example, 300 dpi, the original image 20 is captured at slightly different increments of time, thereby introducing a distortion in the scanned image 30. In FIG. 3a, the scanned image 30 is characterized by a series of vertical bars 32 which maintain a regular spacing between the individual bars 32, but alternately vary in width dimension. That is, bars 32a, 32b, have alternating width dimensions W1, W2, respectively.

The scanning grid 40 is pictorially illustrated as yet another series of vertical bars 42 interposing the original image 20 and the scanned image 30. Each bar 42 thereof is indicative of a moment in time when the scanner samples or captures a segment or part of the original image 20. By careful examination and comparison of the vertical bars 42 of the scanning grid 40 to the vertical bars 22 of the original image 20 (best seen in the exploded view of FIG. 3b), it will be appreciated that the scanner prints a vertical bar 32, or portion thereof, only at those instances in time when the bars 42 of the scanning grid 40 intercept or correspond to a vertical bar 22 of the original image 20.

For example, the first two bars $42_{T1}$ and $42_{T2}$ intercept the first bar 22a of the original image. Accordingly, the first vertical bar 32a of the resulting scanned image 30 has a thickness which spans at least these two increments $42_{T1}$, $42_{T2}$ of the scanning grid 40. It is only until the third scanning increment $42_{T3}$ that it first scans or views white space between the first and second bars 22a, 22b of the original image 20.

Between the third and forth increment $42_{T3}$ and $42_{T4}$, no image is captured and a white space $30_{s1}$ is produced in the scanned image 30. The fourth increment or vertical bar $42_{T4}$ in the scanning grid 40 is aligned with and corresponds to the second vertical bar 22b of the original image 20, however, the fifth vertical bar $42_{T5}$ aligns with and corresponds to a second white space $22_{s2}$ in the original image 20. Consequently, the second vertical bar 32b of the scanned image 30 is thin by comparison to the first vertical bar 32a inasmuch as only one increment of the scanning grid 40, i.e., vertical bar $42_{T4}$, was available to sample or capture a portion of the vertical bar 22b of the original image 20.

It is this variation in print and scanner resolutions that produces a distortion in the scanned image 30. This distortion includes a frequency component, i.e., the aforementioned beat frequency, which can be observed in the scanned image 30. In the above example, this distortion can be seen as vertical bars of alternating thickness, although the total number of vertical bars remains the same, i.e., a total of twenty-five (25). The value of the beat frequency equals the absolute value of the difference between the printing and scanning frequencies. This relationship will be used in another embodiment of the invention wherein irregularities in the print resolution between two or more sections of an image are purposefully introduced to aid in image authentication.

In the broadest sense of the invention, the method scans the printed image for identifiable differences in the anticipated and actual spatial position of select columns of the printed image. By the "difference between the anticipated and actual spatial position" is meant the difference in the orientation, spacing and/or phase shift between select columns of the print grid. The select columns are taken from various predefined sections of the image which may correspond to, for example, a left or right-hand section of the image or, in the case of a postage indicium, a graphic and barcode image section thereof. By examining the differences/irregularities, a determination can be made concerning the authenticity of the printed image. That is, a determination can be made as to whether the image is valid or invalid.

In one embodiment of the invention, the method examines detectable changes in the beat frequency, a phase shift in the beat frequency, and/or some spatial separation/rotation to determine that the image has been altered, i.e., such as by cutting and pasting two portions of the image. In a second embodiment of the invention, predetermined phase changes are introduced into portions of the image, i.e., between at least two distinct sections of the image, to determine whether the printed image has been copied. With respect to the latter, a phase change is purposefully introduced at the time of printing, i.e., a change which cannot be readily reproduced by conventional copying equipment, hence, the image can be validated as being authentic or a copy.

These differences/irregularities can be rapidly processed by automated equipment to flag when an image may be suspect, and consequently, subject to further inspection. As mentioned hereinbefore, the method is described in the context of postage indicia; however, the teachings described herein are applicable to any digitally-printed image wherein alteration or copying thereof is attempted.

Figure 4A:
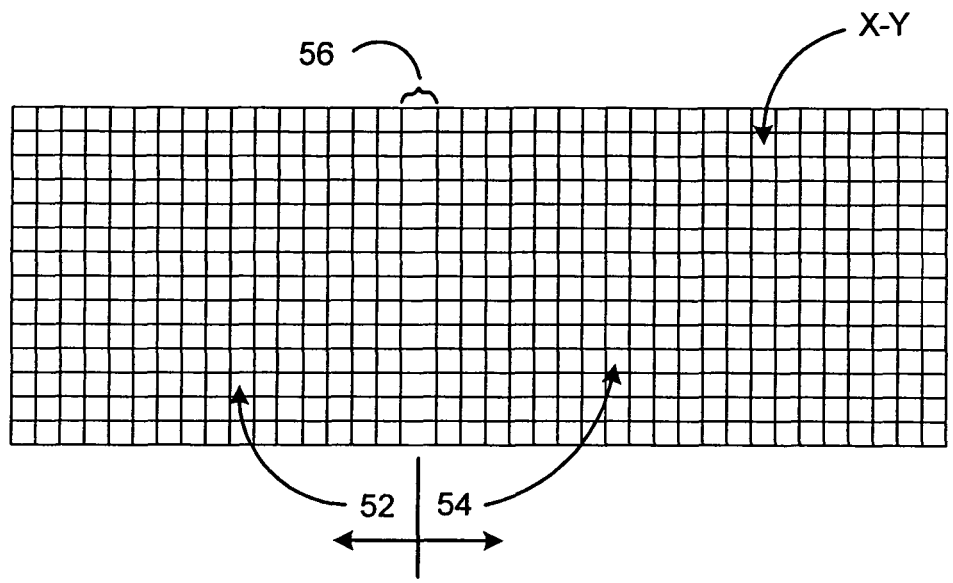
FIG. 4a is a schematic representation of the print grid shown in FIG. 2 after an alteration of the printed image such as by cutting and pasting sections of the printed image.
Figure 4B:
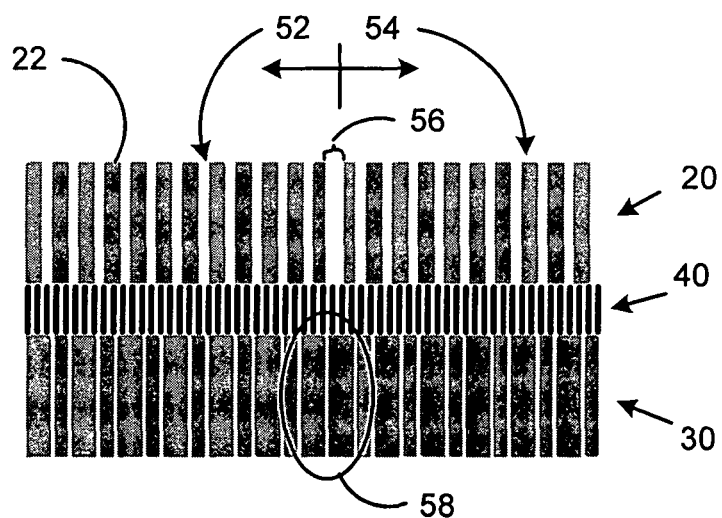
FIG. 4b is a schematic representation of the resulting phase shift of the beat frequency in different sections of a printed image shown in FIG. 3a after an alteration of the printed image such as by cutting and pasting sections of the printed image.

In FIG. 4a, anticipated changes in a print grid X-Y, i.e., in the column separation or spacing, are shown as a result of a "cut and paste" attack on a printed image such as a postage indicium 10. Similarly, the impact of such alterations on the beat frequency is shown in FIG. 4b. For the purposes of illustration, the print grid X-Y (FIG. 4a) and vertical bars 22 of the originally scanned image 20 (FIG. 4b) are each separated into two sections, i.e., a left-hand section 52 corresponding to a graphic image portion 22 of the indicium 10 and a right-hand section 54 corresponding to a barcode image portion 24 of the indicium 10. The significance of assigning such regions to the indicia of each figure will become apparent when addressing certain assumptions made when practicing the inventive method.

In FIG. 4a, when a cut and paste alteration is made in connection with a postage indicia, it is highly unlikely that the spatial separation and/or rotational relationship between two sections of the grid X-Y will remain unchanged. That is, an assumption is made that one or more columns 56 of the grid X-Y will widen or close as a result of placing one of the sections 52, 54 farther or closer to the other of the sections 52, 54. Similarly, in FIG. 4b, the separation of the vertical bars 22 at the point of re-attachment, will also differ or change by comparison to the original spacing therebetween. Consequently, the method of the present invention examines the print grid X-Y and/or the beat frequency for changes which may exist between at least two sections of the image. In the described embodiment, the two sections of interest may include the graphic and barcode sections 22, 24 of the postage indicia 10 (referring to the sample shown in FIG. 1). As such, a determination can be made concerning whether an alteration has or has not been attempted.

Figure 5:
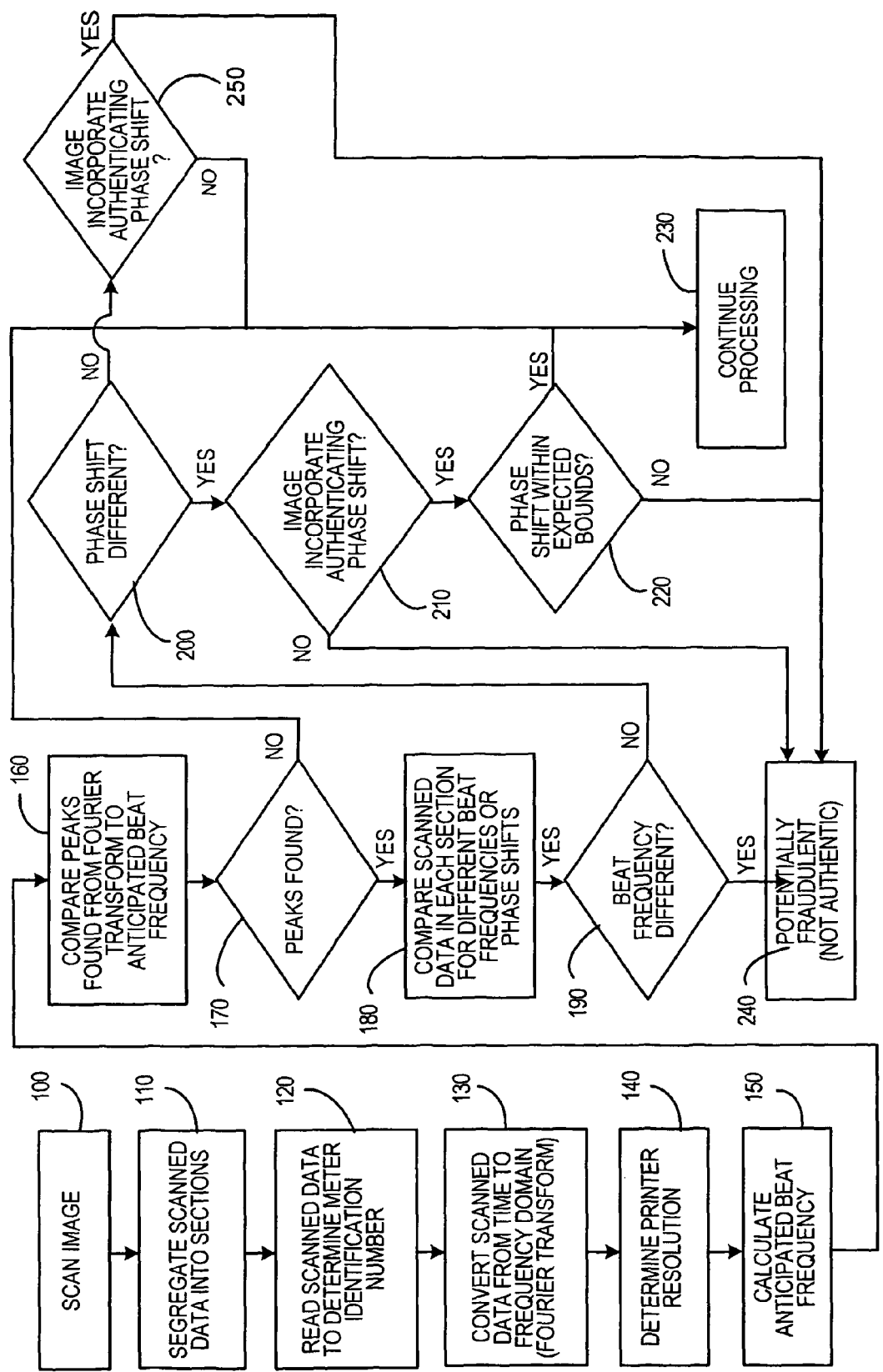
FIG. 5 is a flow diagram of the method steps employed to examine the printed image for irregularities in the print grid and for making a determination concerning the authenticity of the printed image.

The various method steps for practicing this embodiment of the invention are depicted in FIG. 5. For postage indicia, the method will typically be implemented at the time of induction of a mailpiece into the mail distribution system, i.e., when the mailpiece postage is validated and cancelled. In step 100, the indicium is scanned using conventional automated postal scanners having a known or predefined scan resolution. Typically, such postal scanners are low resolution (e.g., approximately 256 dpi) inasmuch as they are generally designed to recognize text rather than graphic images. In step 110, the scanned data is segregated into at least two distinct groups of digital data. With respect to the postage indicium 10, a first group of digital data may correspond to the graphic section 22 (see FIG. 1) and a second group of digital data may correspond to the barcode section 24 of the indicium 10. Generally, the point chosen or predefined to segregate the data will be a column of data or area of white space located between the graphic and barcode sections 22, 24 of the postage indicium. Hence, the first group of digital data may be defined as all data to one side of a predefined column of data, and the second group defined as that data to the other side of the predefined column of data.

If the barcode section 24 contains information concerning the postage meter identification number, it may be useful to record this information in step 120. More specifically, inasmuch as subsequent steps (e.g., steps 140 and 150) of the method require information relating to the print grid or resolution (originally established to print the indicium), a database of such print resolutions may be stored and called upon to perform various calculations and/or validate a conclusion, i.e., a determination that the image is not authentic.

In step 130, a Fast Fourier Transformation (FFT) is performed on the digital data, i.e., converting the data from a time/spatial domain to a frequency domain. As such, conversion of the data yields data peaks at the beat frequency created as a consequence of the difference in the resolutions of the printer and the scanner. Inasmuch as the digital data has been segregated into at least two groups of data, the data peaks may occur at the same or different intervals from one group to the other. It will be understood by one skilled in the art that a FF Transform may be used to decompose data from the time or space domain to a representation of that same data in the frequency domain. The result of the FF Transform is a data set indicative of the frequencies present in the original data.

In particular, this data set consists of two series of data representing the magnitudes of sine and cosine waves at various frequencies. It will be understood by one skilled in the art that this data can be converted to a magnitude and/or phase for each frequency, also called polar notation. If a FF Transform is performed on an image printed at a particular resolution, peaks (larger values) in magnitude of the transform data will occur at the print resolution.

Unfortunately, the sampling of data by digital equipment (e.g., using a scanner) also occurs at a specific frequency, introducing limitations and artifacts into the FF Transform data. One such limitation is that the highest frequency that can be observed in the FF Transform data is one-half (½) of the sampling frequency, also known as the Nyquist frequency. Due to this limitation, the scanning resolution of imaging systems is generally required to be at least twice the printing resolution of the system producing the images that will be scanned. This invention overcomes this limitation by taking advantage of an artifact, i.e., the beat frequency (discussed subsequently), introduced by the difference in printing and scanning resolutions.

Inasmuch as such data conversion is commonly performed to transform data from one domain into another, further discussion of the mathematic formulae and matrixes to perform the FF Transform is not discussed in greater detail herein. Suffice it to say that one skilled in the art will have the requisite knowledge to perform this algebraic operation.

In step 140, the printer resolution used to produce the original printed image is determined. Such print resolution data will be used subsequently to calculate an "anticipated" beat frequency in step 150. More specifically, a database (not shown) of known postage meters can be accessed to acquire print resolution data associated with the postage meter identification number (obtained in prior step 120). Alternatively, a database of potential print resolution data can be maintained for the purpose of creating a complete list of the potential print resolutions used to create the printed image. Alternatively, the print resolution can be determined by looking for peaks in the aforementioned FF Transform.

With predetermined information concerning the print resolution, in step 150 an anticipated beat frequency can be calculated as a function of the scan and print frequencies. As an aside, the terms "resolution" and "frequency" can and are used interchangeably in the art of digital printers and scanners. The following relationship (1.0) is used to calculate the anticipated beat frequency:

$$\text{Anticipated Beat Frequency} = /\text{Scan Frequency} - \text{Print Frequency}/ \quad (1.0)$$

wherein the Scan Frequency is the resolution of the postal equipment scanner and the Print Frequency is the print resolution obtained from the database of postage meter print resolution data. The anticipated beat frequency, therefore, is the absolute value of the difference between the scanner and print resolutions/frequencies.

If a list of potential print resolution data has been compiled, for example, if a total of five potential postage meter types may have been employed to produce the indicia, then an equal number of anticipated beat frequencies can be calculated and stored in a list for later comparison and use. For the purpose of subsequent discussion, it will be assumed that the print resolution of the postage meter employed to print the image is known.

In step 160, a comparison is made between the calculated or anticipated beat frequency and any "data peaks" which may be found or identified in the data following conversion. Such data peaks are indicative of anomalies or distortions in the printed image such as may be produced by the print and scan resolutions beating against each other, i.e., the beat frequency. In step 170, if no peaks are found in the scanned data, then it may be assumed that no anomalies or distortions exist in the printed image. Hence, in validation step 230, the printed image may be assumed to be authentic and therefore not altered or copied.

In step 180, if peaks are found, then the scanned data is examined in each section 22 and 24. Such examination will compare whether the beat frequency differs from one section to the other or whether a phase shift has been detected from one section to the other. In step 190, if the beat frequency has changed from one section to the other, then the postage indicium is presumed to have been altered, e.g., it has been cut and pasted. Such alteration was previously described and illustrated in FIG. 4*b*. Consequently, in step 240, the indicium may be considered fraudulent or not authentic.

While the beat frequency may not change from one data section to the other, the image is examined for differences in the anticipated vs. the actual spatial position of select columns in each section of the image. That is, the image is examined for changes similar to described and illustrated in FIG. 4*a* and FIG. 4*b*. If no anomalies are present when comparing the two sections, then the image is validated as authentic in step 230. In step 190, if the beat frequency has not changed, then in step 200 it is determined whether or not a phase shift has occurred in the beat frequency between different sections of the image.

Figure 6:
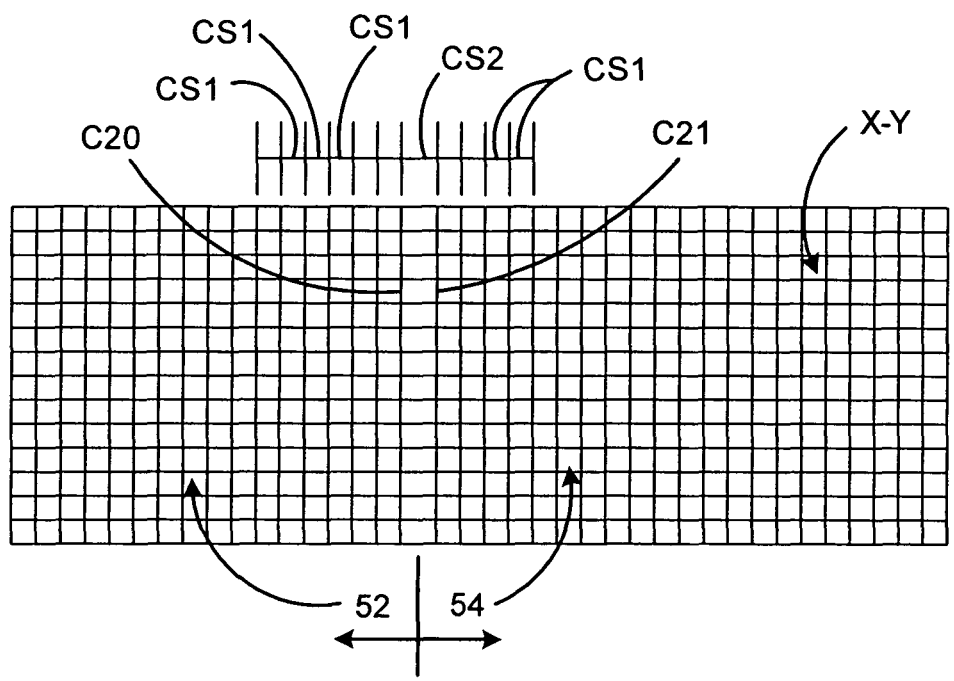
FIG. 6 is a schematic representation of a print grid having a predefined phase shift introduced by a digital printer for the purpose of enabling subsequent validation of a printed image.

While a phase shift may indicate that the image has been altered or copied, if a phase shift has been intentionally introduced, then the printed image may still be authentic. As mentioned earlier, in another embodiment of the invention, a printed image may be prepared to include a predefined and detectable phase shift in the print grid. That is, during printing, the strobe clock of the digital printer can be programmed to change the timing signal such that the width between at least two columns of the print grid is changed. FIG. 6 illustrates the effect of introducing a phase shift in the print grid X-Y. Therein, the timing signal of the strobe clock (not shown) may be delayed to effect a phase shift between two columns C20 and C21. As such, the print grid X-Y is sectioned into a left-hand hand portion 52 and a right hand portion 54. The periodic spatial separation CS1 between the columns of the left and right hand portions are equal, however, the spatial separation CS2 between the columns of the sections 52, 54 is widened to effect the phase shift therebetween. Preferably, the delay causes the increased column width CS2 to be less than twice (2X) the period spatial separation CS1, to ensure that the phase shift is distinguishable from a multiple of the grid spacing.

Figure 1:
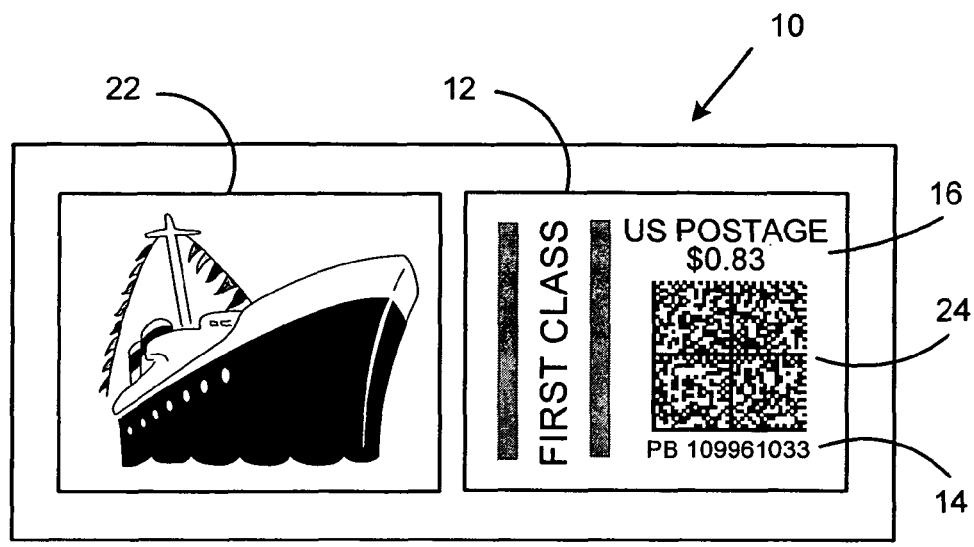
FIG. 1 shows a representation of a prior art postage meter indicium including a graphic portion and a barcode section.

With respect to the postage indicia of FIG. 1, the left hand portion 52 may correspond to a graphic image section 22 while the right hand portion 54 may correspond to a barcode image 24. Preferably, a column of the print grid is widened in a location which has little or no impact on the printed image. This may be achieved by changing the column width in an area of white space, e.g., between two columns of a barcode image or between the graphic and barcode sections of the postage indicium.

If, in step 200, it is determined if a phase shift in the beat frequency between different sections of the image exists, then processing continues at step 210. With knowledge of the print resolution (print grid configuration including the column spacing/separation), a digital scanner such as those used by postal facilities can be programmed to recognize differences in the column spacing/separation. This information may be maintained in a database, perhaps the same database used to identify the print resolution data for a particular postage meter, and called upon in step 210. The digital scanner would, therefore, be equipped to (i) identify the postage meter, i.e., by reading the barcode section of the indicium in step 120, (ii) refer to the database to acquire the relevant data concerning the spatial position of select columns of data e.g., including phase shift information, (iii) compare the scanned phase shift data to the anticipated or recorded phase shift information and (iv) in step 210, make a determination as to whether the scanned phase shift data is within some anticipated range (to account for small errors or deviations during the scanning process). If, in step 220, the anticipated phase shift is within the bounds of the anticipated range, then a conclusion may be reached in step 230 that the printed image has not be altered or copied, and is authentic. Alternatively, if the identified phase shift is outside of the anticipated range, then the printed image may be viewed as fraudulent or not authentic in step 240.

If, in step 200, it is determined that there is not a phase shift in the beat frequency between sections of the image, processing continues at step 250. If it is determined, based upon knowledge of the print resolution and print grid, as previously discussed, that a phase shift should have occurred between sections of the image, then the image is considered potentially fraudulent at step 240. If a phase shift should not have occurred, then processing continues at step 230.

In summary, the method of the present invention provides several related embodiments which function to determine whether a printed image is fraudulent or authentic. The method examines, and/or intentionally introduces, differences in the print grid (i.e., the spatial position of select columns of printed pixels) which cannot pragmatically be reproduced by alteration or via copying the original printed image. Processors and scanners can readily perform such examination without significant computational or processing requirements. More specifically, with respect to postage indicium, the inventive method enables detection of "cut and paste" attacks by analyzing a single indicium captured by existing postal automation equipment. The captured image is examined to determine the beat frequency introduced by the relationship between the scanning and printing frequencies (or resolutions). A difference in the beat frequency between two sections of the image, i.e., the graphic and barcode sections, indicated that the images were printed at two different resolutions (indicating that a cut and paste attack is being attempted). A difference in a phase shift (assuming that such phase shift is not intentionally introduced) indicates that the printed pixels or columns in the two sections are on different print grids (also indicating that a cut and paste attack is being attempted). It will be understood by one skilled in the art that when considering the phase shift of a particular frequency from one section of the image to the other, a shift may be introduced when splitting the image into two sections. This shift will have to be accounted for prior to determining in an actual phase shift has occurred between the two sections.

Finally, the present invention provides a simple and reliable method for determining when a printed image has been copied and, therefore, is not authentic. A determination of authenticity can be made by intentionally introducing a phase shift, through controlled timing of the digital printer strobe clock. Digital scanners can rapidly determine whether the phase shift is or is not present. Inasmuch as a copied image will only print on a grid for which the copier was configured, the phase shift is essentially emasculated or erased upon copying the image.

While a prerequisite for practicing the method involves control over the printing process, it will be appreciated that there are many applications, especially those where the printed image has significant commercial or monetary value, to which the method is readily applicable. For example, postage indicia are printed using postage meters having highly controlled printing processes. Similarly, paper currency is also printed using highly controlled printing apparatus.

It is to be understood that the present invention is not to be considered as limited to the specific embodiments described above and shown in the accompanying drawings. The description merely illustrates the best mode presently contemplated for carrying out the invention, and is susceptible to such changes as may be obvious to one skilled in the art. Therefore, the invention is intended to cover all variations, modifications and equivalents thereof as may be deemed to be within the scope of the claims appended hereto.

What is claimed is:

1. A method for authenticating an image, the image produced by columns of printed pixels, the method comprising the steps of
    scanning the image to produce digital data;
    segmenting the digital data into first and second groups of digital data corresponding, respectively, to first and second predefined sections of the image;
    determining an anticipated spatial position of select columns of printed pixels from each of the first and second groups of digital data; and
    examining the first and second groups of digital data to identify a difference in the anticipated spatial position and an actual spatial position of select columns from each of the first and second groups of digital data,
    whereby the authenticity of the printed image may be determined based upon the identified differences in the anticipated and actual spatial positions of the select columns of printed pixels.

2. The method according to claim 1 wherein the identified difference is one of a rotary and linear displacement in the actual spatial position of the select columns.

3. The method according to claim 1 further comprising the step of
    converting each of the first and second groups of digital data from a spatial domain to a frequency domain;
    identifying data peaks in each of the first and second groups of digital data, the data peaks in the frequency domain of each of the first and second groups of digital data being indicative of a beat frequency, and
    wherein the identified difference is a change in the beat frequency of the first group of digital data as compared to the beat frequency of the second group of digital data.

4. The method according to claim 1 further comprising the step of
    converting each of the first and second groups of digital data from a spatial domain to a frequency domain;
    identifying data peaks in each of the first and second groups of digital data, the data peaks in the frequency domain of each of the first and second groups of digital data being indicative of a beat frequency, and
    wherein the identified difference is a phase shift in the beat frequency of the first and second groups of digital data.

5. The method according to claim 1 further comprising the step of:
    providing an indication that the printed image is invalid when differences have been identified between the anticipated and actual spatial positions of select columns.

6. The method according to claim 1 wherein, prior to the scanning step, identified differences have been intentionally introduced into the printed image, and further comprising the step of:
    providing an indication that the printed image is valid when the identified differences are present.

7. A method for authenticating a postage indicium, the postage indicium produced by a plurality of columns of printed pixels, the method comprising the steps of
    scanning the postage indicium to produce digital data;
    segmenting the digital data into first and second groups of digital data corresponding, respectively, to a graphic and barcode image sections of the postage indicium;
    determining an anticipated spatial position of select columns of printed pixels from each of the first and second groups of digital data; and
    examining the first and second groups of digital data to identify a difference in the anticipated spatial position and an actual spatial position of select columns from each of the first and second groups of digital data,
    whereby the authenticity of the postage indicium may be determined based upon the identified differences in the anticipated and actual spatial positions of the select columns of printed pixels.

8. The method according to claim 7 wherein the identified difference is one of a rotary and linear displacement in the actual spatial position of the select columns.

9. The method according to claim 7 further comprising the step of
    converting each of the first and second groups of digital data from a spatial domain to a frequency domain;
    identifying data peaks in each of the first and second groups of digital data, the data peaks in the frequency domain of each of the first and second groups of digital data being indicative of a beat frequency, and
    wherein the identified difference is a change in the beat frequency of the first group of digital data as compared to the beat frequency of the second group of digital data.

10. The method according to claim 7 further comprising the step of
    converting each of the first and second groups of digital data from a spatial domain to a frequency domain;
    identifying data peaks in each of the first and second groups of digital data, the data peaks in the frequency domain of each of the first and second groups of digital data being indicative of a beat frequency, and
    wherein the identified difference is a phase shift in the beat frequency of the first and second groups of digital data.

11. The method according to claim 7 wherein the postage indicium is scanned at a predefined scan resolution and further comprising the steps of:
    reading the barcode image section of the postage indicium to determine a postage meter identification number, the postage meter having a predetermined print resolution,
    calculating an anticipated beat frequency of the image as a function of the predefined scan resolution and the predetermined print resolution; and
    providing an indication that the printed image is valid when the actual beat frequency is within a threshold range of the anticipated beat frequency.

12. A method for authenticating an image having printed pixels defining a plurality of columns, the method comprising the steps of:
    determining a first spatial separation between adjacent columns of the image;
    determining a second spatial separation between adjacent columns of the image, the second spatial separation being different than the first spatial separation; and
    printing the image such that adjacent columns are separated by the first spatial separation and at least two columns are separated by the second spatial separation,
    whereby the image may be authenticated based upon a determination that the second spatial separation is present.

13. The method according to claim 12 further comprising:
    scanning the printed image;

examining the scanned printed image to determine if the second spatial separation is present, and authenticating the printed image as being valid upon confirmation that the second spatial separation is present.

14. The method according to claim 13 wherein the scanning step is performed by an automated scanning device.

15. The method according to claim 12 wherein the image is printed by a digital printer having a strobe clock, the strobe clock issuing a timing signal for controlling the first spatial separation between each of the plurality of columns, and further including the step of introducing a change in the timing signal to produce the second spatial separation.

16. The method according to claim 15 wherein the change is a delay in the timing signal.

17. The method according to claim 15 wherein the digital printer is a postage meter and wherein the printed image is a postage indicium.

18. The method according to claim 17 wherein the postage indicium includes at least two sections and wherein the second spatial separation is introduced between the first and second sections of the postage indicium.

19. The method according to claim 12 wherein the second spatial separation is less than twice the first spatial separation.

20. The method according to claim 18 wherein the first section corresponds to a graphic section of the postage indicium and wherein the second section corresponds to a barcode section of the postage indicium.

\* \* \* \* \*